United States Patent Office 3,269,598
Patented August 30, 1966

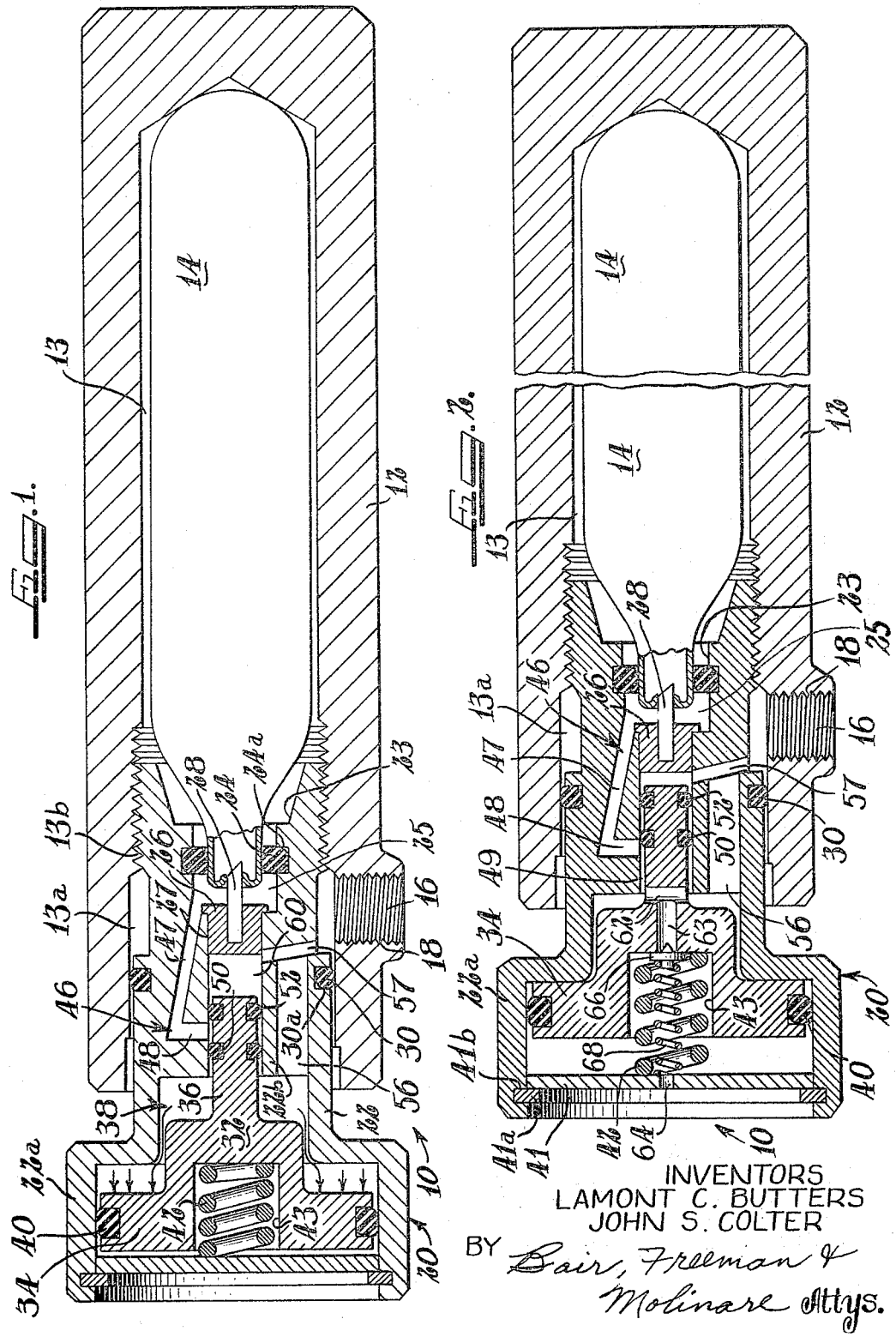

3,269,598
PRESSURE REGULATOR
Lamont C. Butters, Lowell, and John S. Colter, Topsfield, Mass., assignors to Watts Regulator Company, a corporation of Massachusetts
Filed Jan. 13, 1965, Ser. No. 425,147
10 Claims. (Cl. 222—5)

The present invention relates generally to a pressure regulator adapted for use with a dispensing device and, more particularly, to an improved pressure regulator for use in supplying gas pressure to a dispenser for ebullient liquid such as beer.

There has recently been introduced into the marketplace relatively large containers of beer for use in the home. Such containers preferably should be provided with a means for effecting selective dispensing of beer from the container and its has heretofore been proposed to utilize compressed gas from pierceable cartridges of $CO_2$ gas for that purpose. However the means for regulating the very high pressure $CO_2$ gas from a cartridge thereof to a much lower pressure for effecting dispensing of the beer has posed certain problems of providing an efficient yet economical regulator.

An object of the present invention is to provide an improved pressure regulator for use in supplying gas pressure to a container for ebullient liquid such as beer, wherein the regulator is very compact yet efficient so that it may be utilized with any type of dispensing apparatus that utilizes a cartridge-type of pressurized gas supply.

Another object of the present invention is to provide a relatively simple and inexpensive pressure regulator means for efficiently controlling the flow of pressurized gas from a pressurized gas cartridge to a container for ebullient liquid.

Other objects and advantages of the present invention will become more apparent hereafter. The specific structural details and their mode of functioning will be made most manifest and particularly pointed out in clear, concise and exact terms in conjunction with the accompanying drawing, wherein:

FIGURE 1 illustrates a longitudinal, cross-sectional view through the improved pressure regulator means of the present invention, showing the movable piston thereof in one position; and FIGURE 2 is a fragmentary view similar to FIGURE 1 but showing the movable piston thereof in a second position.

Referring now to the drawing, there is illustrated the pressure regulator of the present invention. The pressure regulator generally indicated at 10 is a self-contained unit that is adapted to engage with a housing 12 defining an elongated chamber 13 for receiving therein a puncturable cartridge 14 of pressurized gas. The housing 12 may be a part of a dispensing mechanism or other structure adapted for securement to a container of beer. It is sufficient to observe that the housing 12 is provided in a side wall thereof with a transverse flow passageway 16 through which gas at reduced pressure may be discharged from the pressure regulator to a container for the ebullient liquid. The wall of flow passageway 16 is threaded at 18 to provide for connection of the device to means adapted to receive the reduced-pressure gas from the regulator. The mouth end of housing 12 has an enlarged bore 13a which communicates with flow passageway 16 and the interior of housing 12 is threaded at 13b, with passageway 16 located axially of housing 12 between threads 13b and the open end of the housing.

A valving and cartridge-piercing assembly generally indicated at 20 is adapted to be screw-connected through threads 13b to the housing 12. The valving and cartridge-piercing assembly includes an elongated body 22 having a socket or recess 23 defined at one end thereof, such socket being adapted to sealingly receive therewithin the pierceable end of the puncturable cartridge 14. An O-ring 24 provided in an annular recess 24a in the wall of the socket 23 is arranged to sealingly engage the side wall of the neck of cartridge 14 to assure that there will be no leakage of pressurized gas from a chamber 25 defined between the end of the cartridge 14, the O-ring 24, and the inner or bottom portion of the socket 23.

A headed closure plug 26, that is press fit into a central bore 27 of body 22 to provide sealing therebetween, carries a cartridge-piercing pin 28 which extends into the socket 23 such that when the valving and cartridge-piercing assembly is moved axially of housing 12 through means of the threads 12b, the piercing pin 28 will be caused to engage and puncture the puncturable end of the cartridge 14 to permit the release of pressurized $CO_2$ gas from the cartridge 14. The $CO_2$ gas is communicated from cartridge 14 into chamber 25 in a suitable manner, for example, the gas may flow about the pin as shown for example in Hennis Patent 3,023,932.

Sealing means are provided between the exterior of the body 22 and the interior wall defining the chamber 13a. The threaded connection including threads 13b provides a substantial degree of sealing. Additional sealing is provided by an O-ring 30 carried in a recess 30a in the body 22. It will be seen that the O-ring seal 30 which engages the smooth inner peripheral wall of housing 12 adjacent the recess enlargement 13a functions to permit relative axial sliding movement between the valving and cartridge-piercing assembly and the housing 12 as the two members are screw adjusted relative to one another. The outer end of body 22 is enlarged to define a combination handle and cylinder 22a as is explained hereinafter. By gripping handle 22a and housing 12, the screwing movement therebetween may be effected.

Within the body 22, there is an elongated valving member generally indicated at 32 shaped to define a relatively large diameter piston 34 and a relatively small diameter valve stem 36. The body 22 is generally tubular and defines spaced large and small tubular portions therein arranged to slidingly receive therein said piston 34 and said valve stem 36. The large tubular portion is in handle 22a and serves as a cylinder for receiving piston 34. The body 22 and the valving member 32 cooperate with one another to define therebetween a reduced pressure chamber generally indicated at 38.

An O-ring 40 seated in a recess in the periphery of piston 34 defines a sliding seal between the piston and the relatively large tubular portion or cylinder 22a of body 22, for preventing the escape of pressurized gas from chamber 38 while permitting movement of the piston. An abutment wall or closure plate 41 is positioned in the open end of cylinder 22a and is there retained by a snap ring, or similar retainer, 41a that enters peripheral groove 41b on body 22.

Spring means are provided for urging the valving member 32 in an opposite direction against the force of pressurized fluid in chamber 38 and toward the position of FIG. 2. Such means includes a coil spring 42 disposed in a recess 43 in the piston 34 and bearing at one end against the valve member 32 and at the other end against said imperforate cover member or closure plate 41.

The high pressure gas is communicated from pierced cartridge or bulb 14 via chamber 25 to a passageway 46 defined in body 22. Passageway 46 includes a longitudinally extending inclined portion 47 and a radially oriented gas-inlet aperture portion 48. When the valving member 32 is in the position of FIG. 2, there is defined between stem 36 and the surrounding sleeve 22b of body 22 an annular flow passageway 49 of restricted dimension which serves as a resistance to gas flow and serves as a pressure reducing means between the cartridge 14 and the reduced-pressure chamber 38. The high pressure of the gas is reduced as it flows through the annular restricted passage 49 to a predetermined lower pressure more satisfactory for delivery to the container of beer for effecting pressurized discharge of the beer.

A pair of axially spaced sealing elements are provided on valve stem 36 for cooperating, as in FIG. 1, with gas-inlet aperture 48 to control the flow of gas from the cartridge 14 to chamber 38. The sealing means comprise a pair of resilient O-rings 50 and 52 carried in axially spaced recesses in stem 36 and slidably cooperating with the interior wall of the small tubular portion 22b of body 22. When the O-rings 50 and 52 engage the small tubular portion of the body on opposite sides of the gas-inlet aperture 48, the flow of gas from cartridge 14 is halted. When the valving member 32 is moved to the right (as viewed in FIGURE 2) such that both O-rings are to the same side of aperture 48, the gas-inlet aperture 48 communicates with the reduced pressure chamber 38 via pressure reducing passage 49.

The reduced pressure gas chamber 38 includes a bore 56 that communicates with a transverse flow channel 57 which opens into enlarged annular recess 13a which communicates to flow passageway 16. The transverse channel 57 communicates with a chamber 60 defined between the tip end of valve stem 36, closure plug 26, and the tubular portion 22b in which stem 36 slides.

Considering now the operation of the novel pressure regulator, the body 22 is removed from housing 12 in the dispensing apparatus. A cartridge 14 is inserted into the elongated chamber 13 in housing 12. As the body 22 is screwed into the housing, the O-ring 30 engages the adjacent interior wall of housing 12 and seals between the atmosphere and any low pressure gas that may escape between the threads. When the valving and cartridge-piercing assembly 20 is screwed further into housing 12, the O-ring 24 slides over the pierceable end of the puncturable cartridge 14, and functions to prevent undesirable leakage of high-pressure gas from the pressure regulator 10.

Upon further screwing of the assembly 20 into the housing 12, the piercing pin 27 punctures the cartridge 14 and opens a port releasing the high-pressure gas, such as $CO_2$, from the cartridge.

Prior to release of pressurized gas from cartridge 14, the valving member 32 is biased to the right as viewed in FIG. 2 by spring 42 to a position wherein the axially spaced sealing O-rings 50 and 52 are both to the same side of gas-inlet aperture 48. Thus, pressurized gas released from cartridge 14 flows through passages 47 and 48 and through pressure reducing annular space 49 around valve stem 36 into the reduced-pressure chamber 38 that communicates with passageways 56, 57 and 16.

As gas flows into the reduced-pressure chamber 38 it builds up pressure which is exerted over the equivalent of the entire surface of piston 34 exposed to chamber 38, causing the piston to move against the bias of spring 42 to the left as indicated in FIG. 1 until the O-rings 50 and 52 are disposed on opposite sides of gas-inlet aperture 49, at which time the flow of gas from cartridge 14 is stopped. Drawing of ebullient liquid, such as beer, from the container therefor will eventually reduce the pressure in the reduced-pressure chamber 38, whereupon spring 42 will overcome the pressure against piston 34 and will move the valving member 32 to a position wherein the gas-inlet aperture 49 is again open and high-pressure gas will again flow from the source into chamber 38. This flow of gas will continue until the predetermined set pressure is obtained, at which time the valving member will again cut off the flow of gas.

The valve biasing spring 42 and the size of piston 34 may be selected and appropriately designed for achieving a predetermined pressure at which the valve opens and closes or, if desired, the spring may be made adjustable to permit adjustment to obtain selected predetermined pressures of operation.

If desired, relief valve means may be incorporated into the pressure regulator for releasing excessive pressure from reduced-pressure chamber 38 to the atmosphere in order to prevent damage to the container for ebullient liquid. A modified pressure regulator embodying such relief valve means is shown in FIG. 2. Provided in the valving member 32 is a passageway comprising a radial bore 62 and an axial passage 63 for communicating reduced-pressure chamber 38 with the opposite side of piston 34 which is in communication with the atmosphere through relief vent 64 in the cover member 41. Axial passage 63 is adapted to be closed by relief valve 66, which is urged to the closed position by relief valve spring 68, disposed between the relief valve 66 and the cover member 41. If excessive pressure above a predetermined level (dependent upon specific spring 68 used) is obtained in chamber 38, relief valve 66 will open to bleed such excessive pressure to the atmosphere through relief vent 64.

The present invention provides a novel compact pressure regulator particularly adapted for controlling the flow of high-pressurized gas from a single use cartridge to the storage chamber of an ebullient liquid dispenser.

While we have shown and described specific embodiments of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

We claim:

1. A pressure regulator for use in supplying gas pressure to a container for ebullient liquid, said pressure regulator comprising, in combination: a housing defining an elongated chamber for receiving therein a puncturable cartridge of compressed gas, and a transverse flow passageway through which gas at reduced pressure is to be discharged from the pressure regulator, a portion of said housing being threaded to adjustably cooperate with a valving and cartridge-piercing assembly, another portion of the said housing defining a sealing surface adapted to serve as part of a seal against undesirable leakage of gas from the regulator; and a valving and cartridge-piercing assembly screw-connected to said housing, said assembly including a body having a socket at one end adapted to sealingly receive thereinto the pierceable end of the puncturable cartridge, a piercing pin on said body projecting within said socket, sealing means between said assembly and said housing permitting relative movement therebetween as said assembly is screw adjusted relative to said housing, an elongated valving member shaped to define a relatively large diameter piston at one end and a relatively small diameter valve stem at the other end, said body defining spaced large and small tubular portions arranged to slidingly receive therein said piston and said valve stem respectively, said body and said valving member being shaped to define therebetween a reduced-pressure chamber with the area of one side of said piston exposed to the gas pressure attained therein so as to be urged in one direction, spring means engaging the valving member to normally bias same in the opposite direction, means communicating gas from said reduced-pressure chamber through said body to the transverse flow passageway in said housing, a gas-inlet aperture in the wall of said small tubular portion of said body, passageway means communicating high pressure gas from a pierced gas cartridge to said gas-inlet aperture, axially spaced sealing means on said stem in engagement with said small tubular portion of said body, the valving member being movable between a closed position, where the spaced sealing means on the stem engage the small tubular portion of the body on opposite sides of said gas-inlet aperture, and an open position where the gas-inlet aperture communicates with said reduced-pressure chamber.

2. A pressure regulator as in claim 1 wherein said axially spaced sealing means comprises a pair of axially spaced O-rings carried on said stem.

3. A pressure regulator as in claim 1, wherein a restricted annular space is provided between the exterior of the valve stem and the interior of the sleeve portion of the body downstream from the gas-inlet aperture and upstream of said reduced-pressure chamber, for effecting a pressure reduction of said high pressure gas.

4. A pressure regulator for use in supplying gas pressure to a container for ebullient liquid from a puncturable cartridge of compressed gas, said pressure regulator comprising, in combination: a valving and cartridge-piercing assembly adapted to be adjustably and detachably affixed to a housing means, said assembly including a body having a socket at one end adapted to sealingly receive thereinto the pierceable end of the puncturable cartridge, a piercing pin on said body projecting within said socket, an elongated valving member shaped to define a relatively large diameter piston at one end and a relatively small diameter valve stem at the other end, said body defining spaced large and small tubular portions arranged to slidingly receive therein said piston and said valve stem respectively, said body and said valving member being shaped to define therebetween a reduced-pressure chamber with the area of one side of said piston exposed to the gas pressure attained therein so as to be urged in one direction, spring means engaging the valving member to normally bias same in the opposite direction, means for communicating gas from said reduced-pressure chamber through said body and adapted to communicate with a container for ebullient liquid, a gas-inlet aperture in the wall of said small tubular portion of said body, passageway means in said body communicating high-pressure gas from the pierced gas cartridge to said gas-inlet aperture, axially spaced sealing means on said stem in engagement with said small tubular portion of said body, the valving member being movable in said body between a closed position, where the spaced sealing means on the stem engage the small tubular portion of the body on opposite sides of said gas-inlet aperture, and an open position where the gas-inlet aperture communicates with said reduced-pressure chamber.

5. A pressure regulator as in claim 4 wherein said axially spaced sealing means comprises a pair of axially spaced O-rings carried in axially spaced recesses in said stem.

6. A pressure regulator adapted to be interposed between a high pressure gas source and a compartment at reduced pressure, said pressure regulator comprising, in combination: a sleeve-like body having inlet passage means for communicating with said high pressure gas source and outlet passage means for communicating with said compartment at reduced pressure, an elongated valving member comprising a relatively large diameter piston at one end and a relatively small diameter valve stem at the other end, said body defining spaced large and small tubular portions arranged to slidingly receive therein said piston and said valve stem respectively, said body and valving member being shaped to define therebetween a reduced-pressure chamber with the area of one side of said piston exposed to the gas pressure attained therein so as to be urged in one direction, spring means in said body engaging the valving member to normally bias same in the opposite direction, means communicating gas from said reduced-pressure chamber through said body to the outlet passage means, said inlet passage means including a transversely disposed gas-inlet aperture in the wall of said small tubular portion of said body and passageway means communicating high pressure gas to said gas-inlet aperture, axially spaced sealing means on said stem engaging with said small tubular portion of said body, said valving member being movable between a closed position, where the spaced sealing means on the stem engage the small tubular portion of the body on opposite sides of said gas-inlet aperture, and an open position, where the gas-inlet aperture communicates with said reduced-pressure chamber.

7. A pressure regulator as in claim 6 which includes pressure relief valve means for bleeding excess pressure from said reduced-pressure chamber.

8. For use in a dispenser for ebullient liquid wherein gas pressure is supplied to the dispenser from a puncturable cartridge of compressed gas, a self-contained pressure regulator comprising a valving and cartridge piercing assembly adapted to be detachably connected to the dispenser, said assembly including a body having a socket at one end adapted to sealingly receive therein the pierceable end of the puncturable cartridge, a piercing pin on said body projecting within said socket, a discharge flow channel in said body, valve means movable within said body between open and closed positions for regulating the flow of compressed gas from said puncturable cartridge to said flow channel, and means responsive to pressure of the compressed gas in the body operatively connected to the valve means for actuating same.

9. A self-contained pressure regulator as in claim 8 wherein said body is externally threaded along a portion thereof for detachably screw-connecting said pressure regulator to said dispenser.

10. A self-contained pressure regulator as in claim 8 wherein pressure relief valve means are provided for venting excess gas pressure within said body to the atmosphere.

References Cited by the Examiner
UNITED STATES PATENTS

| | | | |
|---|---|---|---|
| 1,711,537 | 5/1929 | Lewis et al. | 222—511 X |
| 2,514,773 | 7/1950 | Kromer | 225—1 |
| 2,571,433 | 10/1951 | Fine et al. | 222—399 X |
| 2,778,434 | 1/1957 | Hastert et al. | 222—5 X |
| 2,842,293 | 7/1958 | Knapp et al. | 222—399 |
| 3,127,059 | 3/1964 | Lawrence et al. | 222—52 X |
| 3,219,236 | 11/1965 | Radcliffe | 222—52 |

ROBERT R. REEVES, *Primary Examiner.*

N. STACK, *Assistant Examiner.*